INVENTOR.
GEORGE W. BENJAMIN
BY
Geo. B. Pitts
ATTORNEY

INVENTOR.
GEORGE W. BENJAMIN
BY
Geo. B. Pitts
ATTORNEY

INVENTOR.
GEORGE W. BENJAMIN

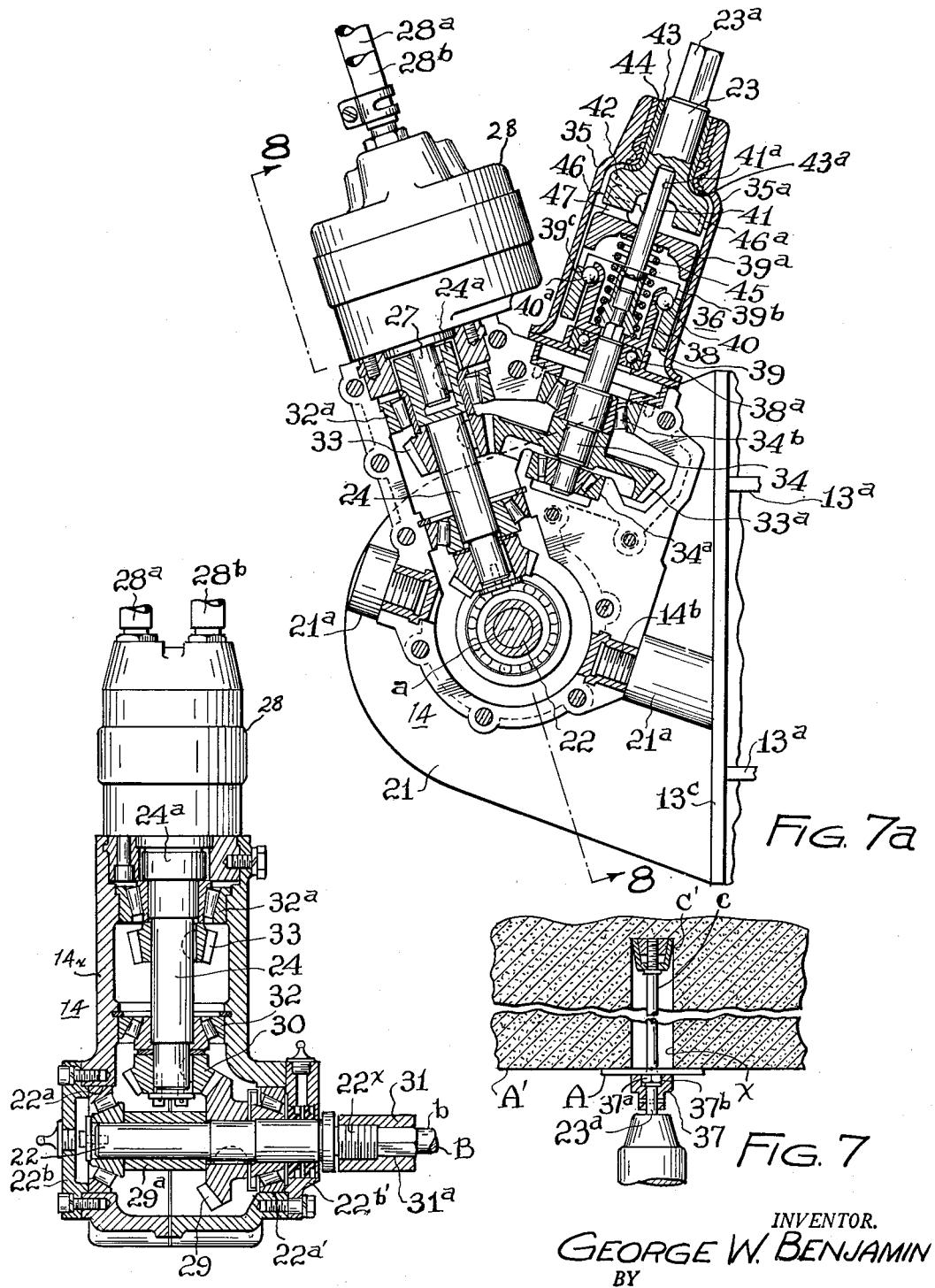

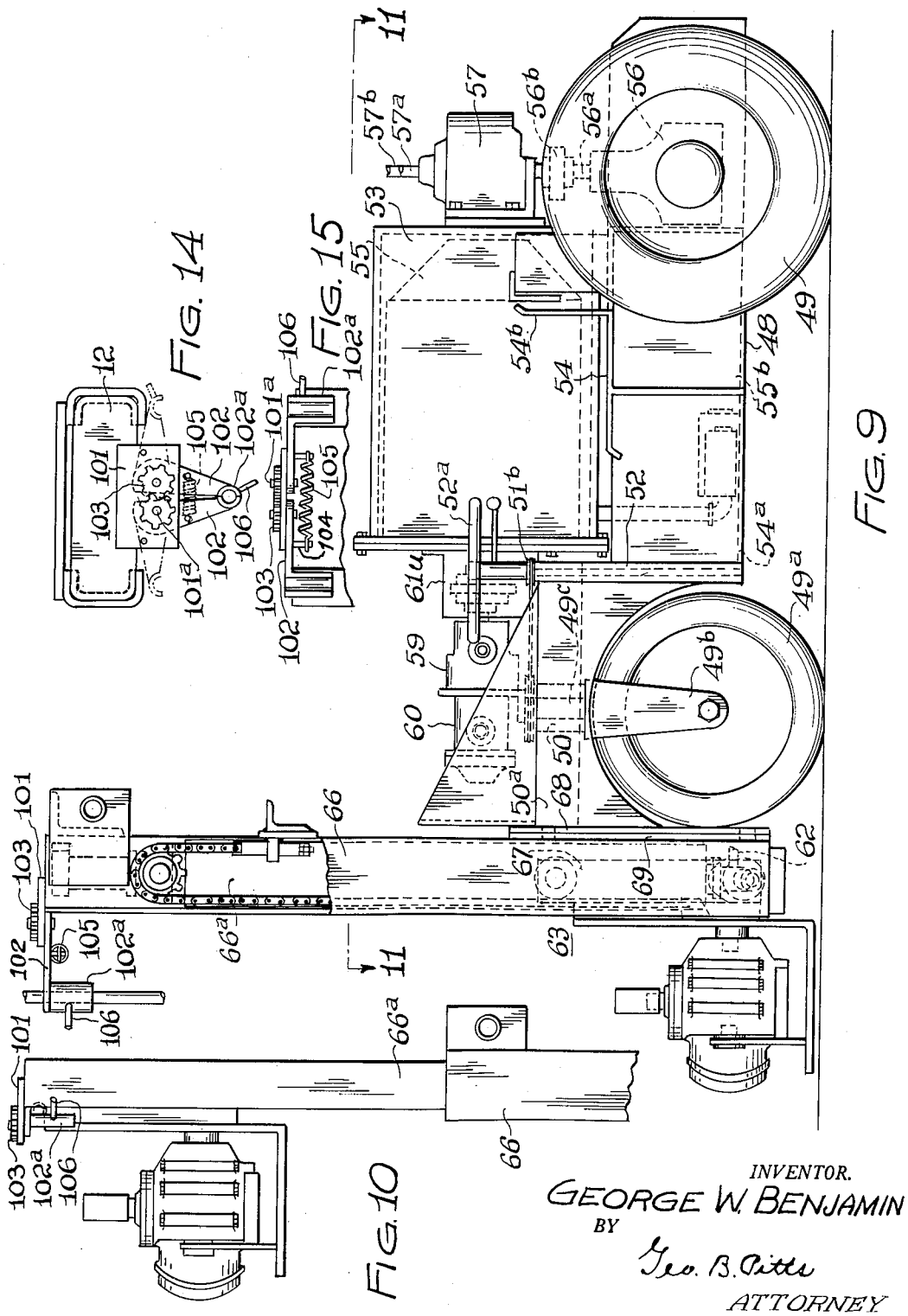

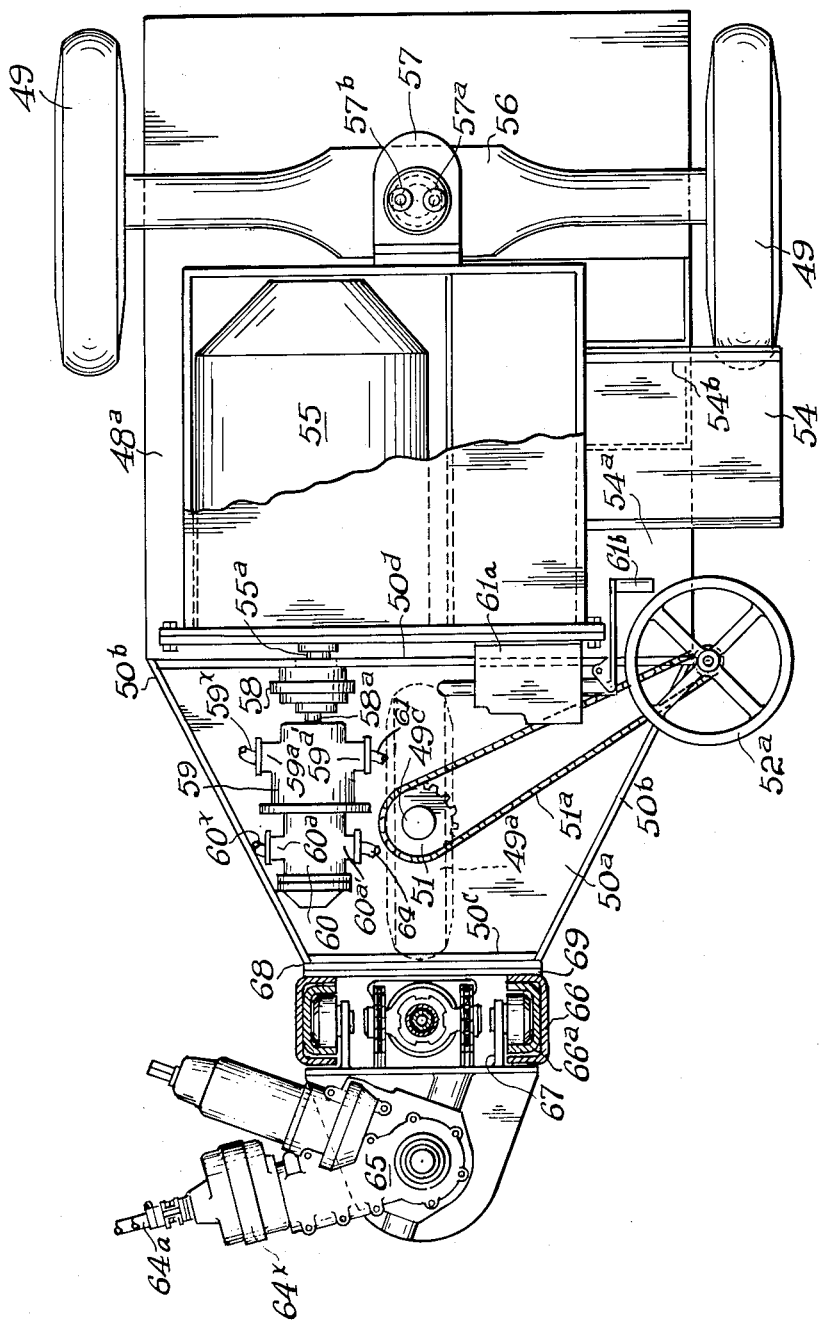

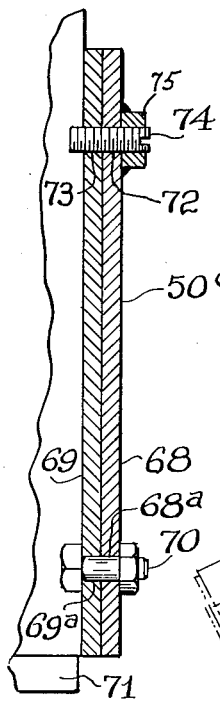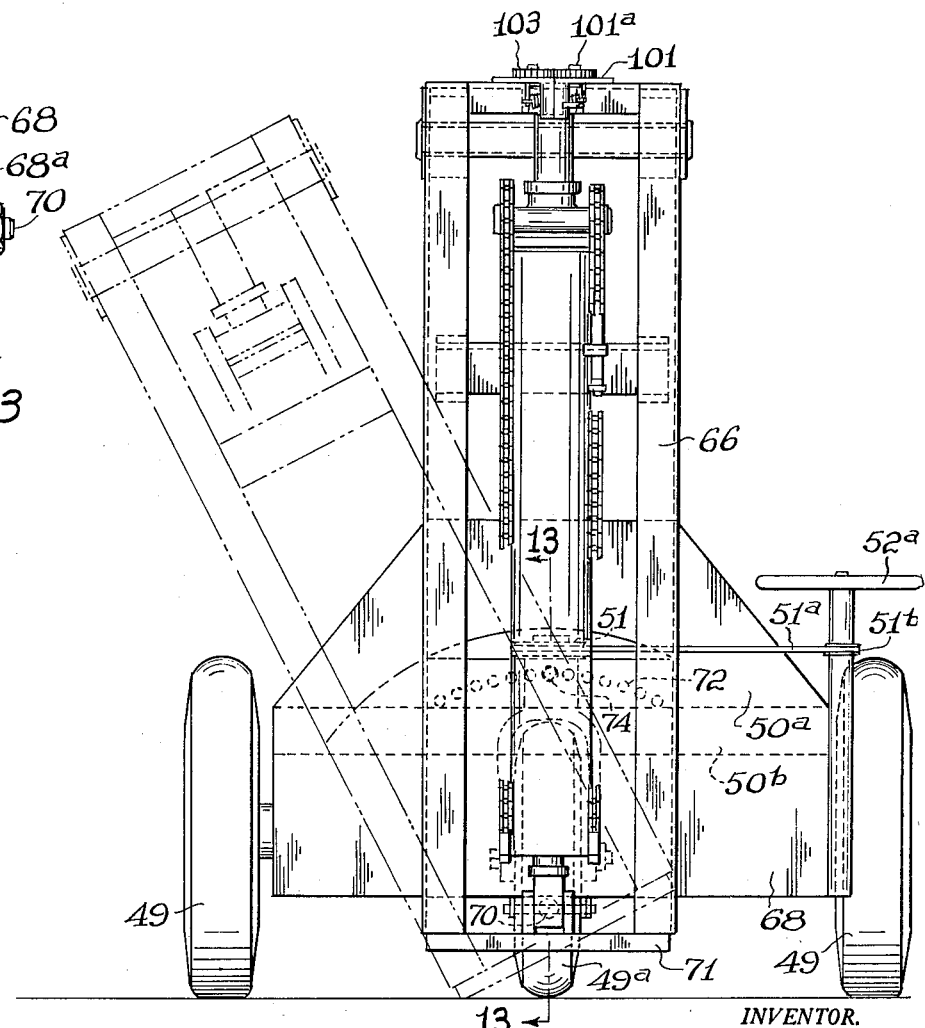
Fig. 13
Fig. 12
INVENTOR.
GEORGE W. BENJAMIN
BY
Geo. B. Pitts
ATTORNEY

United States Patent Office 2,718,118
Patented Sept. 20, 1955

2,718,118

WHEEL SUPPORTED APPARATUS HAVING A VERTICALLY MOVABLE CARRIER FOR A POWER DRIVEN MECHANISM

George W. Benjamin, Danville, Ill., assignor, by mesne assignments, to The Baker-Raulang Company, a corporation of Delaware Application November 21, 1950, Serial No. 196,884

2 Claims. (Cl. 61—63)

This invention relates to a wheel supported apparatus having a carrier for supporting a power driven mechanism, the carrier being movable vertically, whereby, during vertical movement of the carrier and/or at selected levels, the mechanism may be driven to carry out certain overhead operations in a rapid and simplified manner and at a substantial saving in labor and time.

The apparatus embodying my invention is adaptable for operation in excavated areas, especially mines, where the overhead roof or ceiling must be supported against sagging, falling and/or disintegration of the earth and mass of various materials forming the overhead structure, due to weakness thereof, immediately following the excavating operations or may develop at some later time.

The present invention embodies certain improvements in the apparatus, as disclosed in my co-pending application filed April 15, 1950, Ser. No. 156,180, to simplify its construction, whereby its cost is materially reduced and translation of the apparatus through the mine to locations where it is to be employed, and bodily adjustments of the apparatus to successive operating positions in each area or location, are facilitated. The improvements also provide for the positioning of the ceiling supports in a rapid and economical manner with respect to time and labor. The improvements also provide for the drilling of bolt holes which extend substantially perpendicularly to the adjacent surfaces of the ceiling whether such surfaces are horizontal or otherwise disposed. It is to be observed that the surfaces of the ceilings in excavated areas are left in various physical conditions, that is, some surfaces of the area may be substantially horizontal and adjacent or other surfaces may be of irregular shape and/or inclined outwardly and downwardly. To insure positioning of the ceiling engaging members in effective relation to the ceiling under the conditions referred to, the herein disclosed improvements provide for the positioning of each bolt, which holds a ceiling engaging member in position, substantially perpendicularly to the surface engaged by the latter; in this arrangement the entire surface area of each supporting member is uniformly effective to support the ceiling.

In most instances, a single device, such as a bolt, is employed for securing the ceiling engaging member in position, the device extending through and engaging the member substantially centrally of its peripheral edges, but dependent upon the physical condition of the ceiling or the size of the ceiling engaging member, more than one device may be employed.

One object of the invention is to provide an improved apparatus for mounting supporting members in fixed engagement with ceilings of excavated areas.

Another object of the invention is to provide an improved apparatus for mounting reinforcing or supporting members in fixed engagement with ceilings in excavated areas irrespective of the contour of the ceiling surfaces.

Another object of the invention is to provide an improved apparatus for rapidly and economically mounting reinforcing or supporting members in fixed relation to the ceilings in excavated areas, the apparatus including a unitary driven mechanism movable substantially vertically, whereby holes may be initially driven for an anchoring device and the latter securely fixed in the ceiling structure to support the ceiling engaging members in position.

Another object of the invention is to provide an improved portable apparatus embodying a raising and lowering support for a power driven mechanism for carrying out various operations above and/or laterally of the apparatus in roofs, ceilings and overhead structures.

A further object of the invention is to provide an improved portable apparatus having a raising and lowering mechanism provided with an elevating member and having guides therefor capable of being positioned vertically and in selected inclined positions about a horizontal axis.

Other objects of the invention will be apparent to those skilled in the art to which my invention relates from the following description taken in connection with the accompanying drawings, wherein:

Fig. 7 is a fragmentary view, diagrammatically illustrating a roof structure, showing the positioning of a roof engaging member in position;

Fig. 7a is a fragmentary view, partly in section, showing a modified mounting for the driven mechanism;

Fig. 8 is a view on the line 8—8 of Fig. 7a;

Fig. 9 is a side elevation showing a modified form of construction, parts being broken away;

Fig. 10 is a fragmentary elevation showing the carrier in an elevated position;

Fig. 11 is a view, partly in plan and partly in section on the line 11—11 of Fig. 9;

Fig. 12 is a front elevation, the carrier, the elevating member and associated parts being omitted to facilitate the illustration;

Fig. 13 is a fragmentary section on the line 13—13 of Fig. 12;

Fig. 14 is a plan view of parts shown in Figs. 2, 4, 9 and 12; and

Fig. 15 is a front elevation of parts shown in Fig. 14, with the parts in inoperative position.

Figure 1:
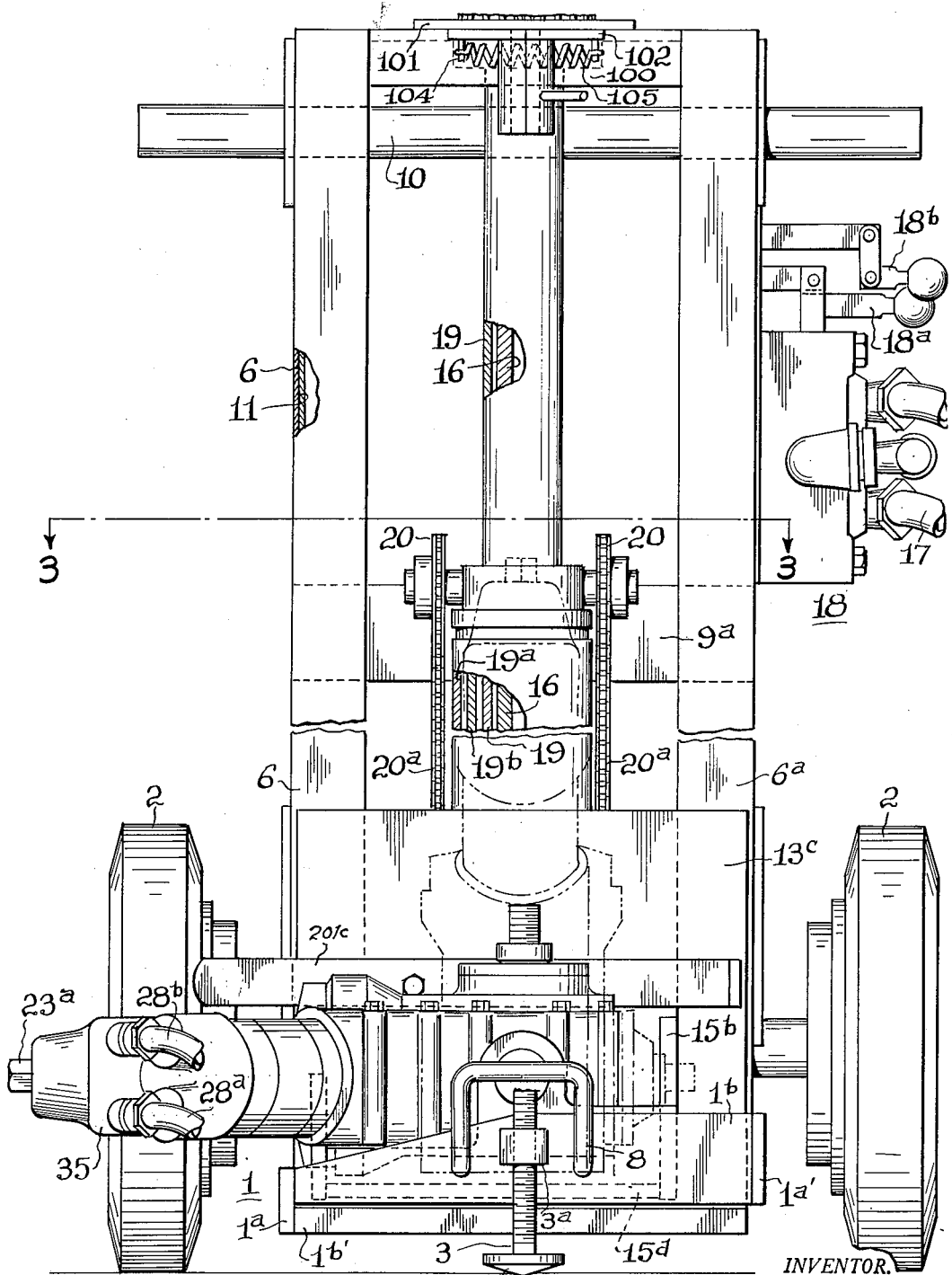
Fig. 1 is a front elevation of an apparatus embodying my invention, parts being broken away.
Figure 5:
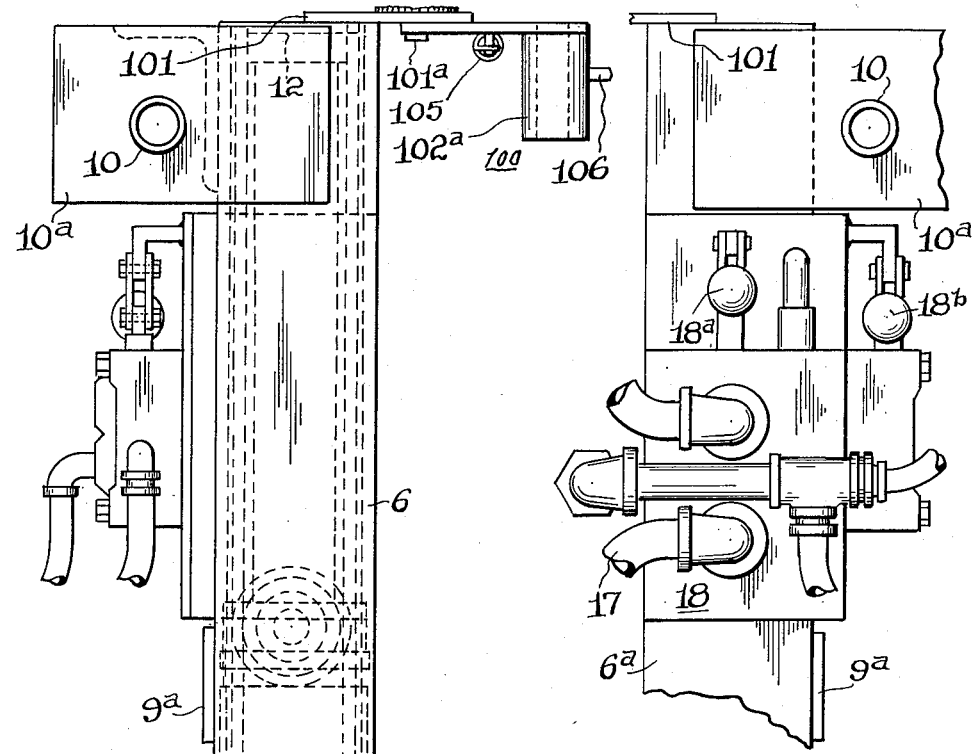
Fig. 5 is a fragmentary elevational view looking toward the left of Fig. 1.

In the drawings (referring to Figs. 1 to 8, inclusive), 1 indicates as an entirety a frame mounted at its opposite ends on supporting devices consisting of a pair of wheels 2 at the rear end of the frame 1 and a screw 3 adjustably threaded through a nut 3a, which is welded to the opposite end of the frame 1, and arranged to engage the surface or ground at its lower end. By preference, the lower end of the screw 3 is provided with a disk 4 to provide a large surface in engagement with the ground. The upper end of the screw 3 is provided with a suitable handle 5, pivoted to the upper end thereof, for manually turning the screw 3, whereby the frame 1 may be tilted about the axis of the wheels 2 to support the frame 1 horizontally, although in some instances it may be found desirable to support the frame in an inclined position. The frame 1 is preferably U-shaped being formed of side plates 1a, 1a', and a front plate 1b, a bottom wall 1b' being secured to the side plates 1a, 1a'. By preference, the inner ends of the side plates 1a, 1a', are welded to the outer sides of spaced outer guides 6, 6a, respectively (see Fig. 3), and the latter are welded to the inner portions of frame members 7 (see Fig. 2), which are disposed in parallel relation and extend rearwardly of the guides 6, 6a. In this arrangement, while the lower portions of the guides form, in effect, a part of the frame 1, fabrication is simplified and less amount of material is required; also, since it is desirable to use relatively large wheels 2 for travel on the floor of excavated areas, the plates 7 are positioned above the side plates 1a, 1a', and utilized to support the axle for the wheels. The front frame plate 1b is provided with a loop-shaped device 8, whereby the frame 1 may be hitched to a tractor or other form of vehicle and moved to and from specified locations. The device 8 may also serve as a handle for maneuvering the frame 1 into different positions for carrying out the operation of reinforcing the roofs in excavated areas, as later set forth.

The outer guides 6, 6a, are of channel shape in cross section and connected together at their lower ends by a base 9 and intermediate their ends by a cross plate 9a. The upper end portions of the guides 6, 6a, are connected together by a hollow, transverse member 10, the end portions of which extend through and are fixed to brackets 10a, the latter in turn being welded to the outer sides of the guides 6, 6a, and extend rearwardly therefrom. The extended ends of the member 10 may be used as handles in maneuvering the frame 1. 11, 11a, indicate inner guides of channel shape in cross section and endwise slidably mounted in the guides 6, 6a, respectively. The upper ends of the guides 11, 11a, are connected together by a cross member 12, and serve as an abutment, as later set forth.

13 indicates as an entirety an elevating member slidably mounted on the guides for movement endwise and independently thereof throughout an initial movement of the elevating member to a predetermined level relative to the guides and relative to the outer guides upon upward movement of the inner guides when the elevating member is to be raised to higher levels. The elevating member 13 consists of a pair of spaced arms 13a disposed between the guides 11, 11a, supporting a carrier 13b on which a power driven mechanism, indicated as an entirety at 14, is mounted. The arms 13a are provided with outwardly extending stud shafts carrying rollers 15 which engage and roll on the side walls or flanges of the guides 11, 11a, during raising and lowering of the elevating member 13. The carrier 13b consists of a vertical wall 13c, to which the arms 13a are welded, and an outwardly extending supporting frame, indicated as an entirety at 15x. The supporting frame 15x consists of spaced side bars 15a, 15b, welded at their inner ends to the wall 13c, a front bar 15c, the opposite ends of which are welded to the outer ends of the side bars 15a, 15b, and a bottom wall 15d. The walls 13c, 15c, are provided intermediate their opposite ends with alined bearings 14a for trunnions 14b provided on the housing 14x for the mechanism 14, whereby the latter may be swung from the horizontal position shown in Figs. 1, 2, 3 and 4 to the vertical position shown in dotted lines in Figs. 1 and 4.

Figure 2:
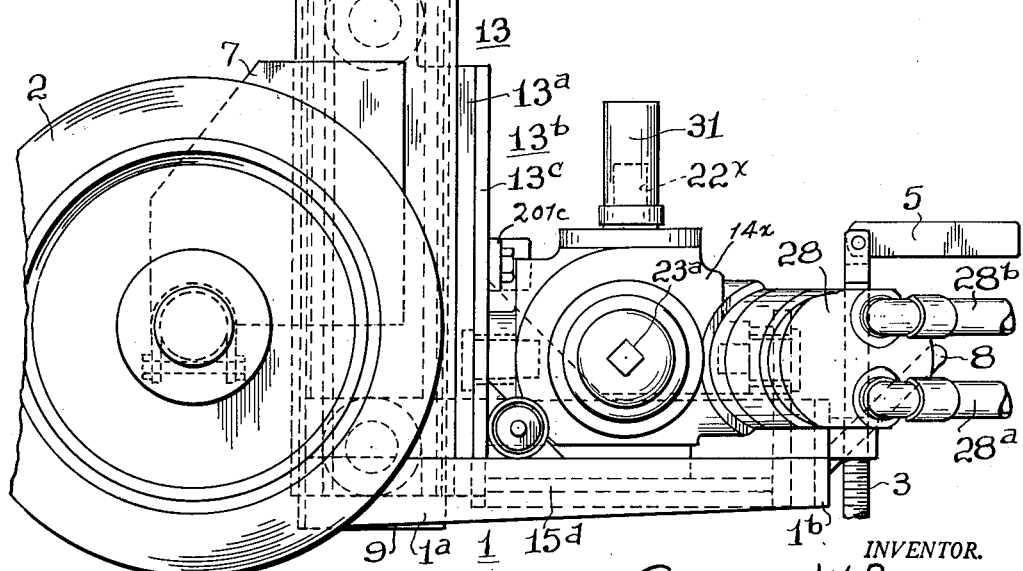
Fig. 2 is a side elevation looking towards the right of Fig. 1, parts being broken away.
Figure 6:
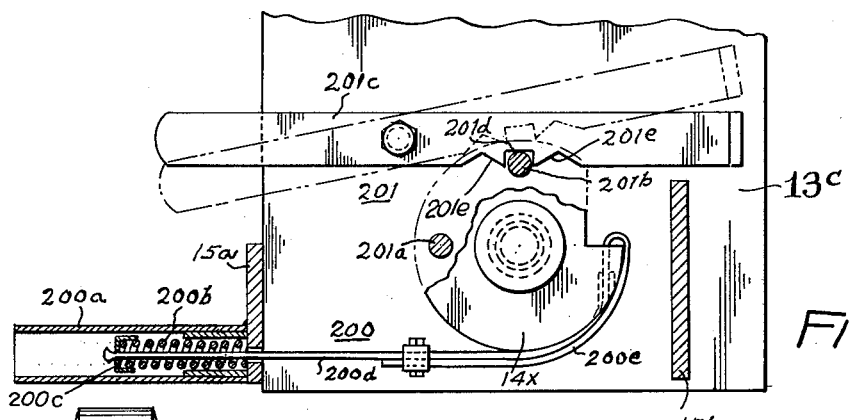
Fig. 6 is a section on the line 6—6 of Fig. 3.
Figure 4:
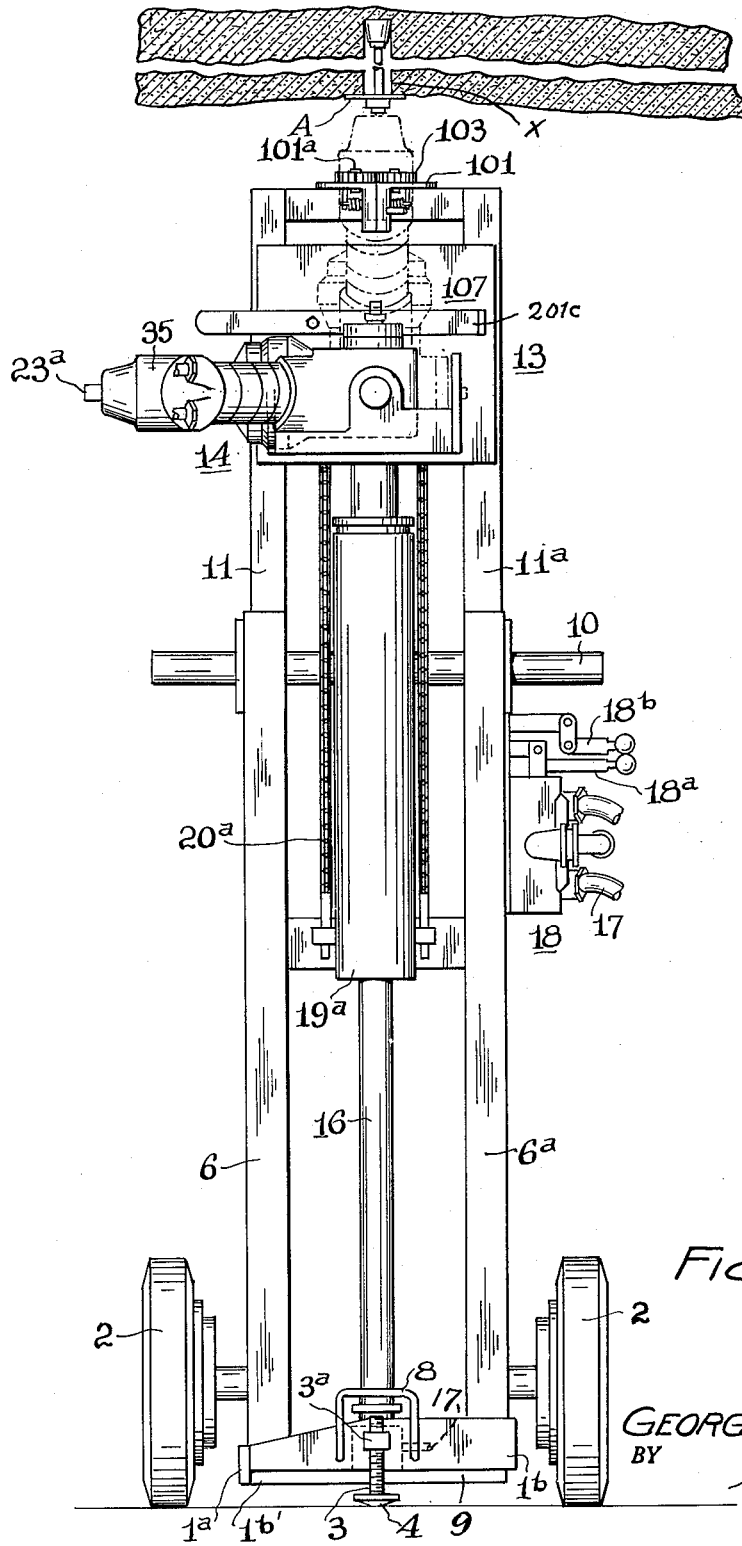
Fig. 4 is a front elevational view showing the elevating member in a raised position and a roof engaging member in position.

The means for raising the elevating member 13 may be of any selected type, for example, electric or fluid operated; and where the latter type is employed, it may be of any desired form of construction, such as shown in Letters Patent No. 2,598,566 to Max Lehmann, for illustrative purposes and consisting of the following instrumentalities; 16 indicates a tubular member mounted at its lower end on the base 9 midway the guides 6, 6a, and extending upwardly approximately the full heighth of these guides. The lower end of the tubular member 16 has connection with a pipe 17 leading from a source of supply of fluid under pressure (not shown), the pipe being provided with a suitable valve mechanism 18. The valve mechanism 18 is operated by a lever 18a, which in one operated position permits flow of the fluid from a pump (not shown) through the pipe 17 to the tubular member 16 and in another operated position permits discharge of the fluid from the tubular member through the pipe 17 to a reservoir (not shown), whereas in the neutral position of the lever 18a flow of the fluid through the pipe 17 in either direction is cut off, whereby the operation of the elevating member 13 to and from selected levels, as later set forth, is controlled. 19, 19a, 19b, indicate inner, outer and intermediate cylinder-piston elements, respectively, concentrically related to the tubular member 16 and having communication one with another and supplied with fluid from the tubular member 16. As shown in Figs. 1 and 2, when the elevating member 13 is in its normal or lowest position, the intermediate element 19b extends above the outer member 19a and supports at diametrical opposite sides thereof reeving devices 20 for flexible members 20a, the inner ends of the flexible members 20a being suitably anchored (preferably on the outer member 19a, as shown in Fig. 4), whereas their outer ends are operatively connected to the elevating member 13 by brackets 20b extending inwardly from the inner wall 13c of the carrier 13b. Operation: when the valve mechanism 18 is operated to supply fluid under pressure to the tubular member 16, the intermediate member 19b is operated upwardly from the position shown in Figs. 1 and 2, the effect of which is to raise the elevating member 13 relative to and independently of the guides 11, 11a, to selected levels and/or to the upper ends of the latter; upon movement of the elevating member 13 to the upper ends of the guides 11, 11a, if the supply of fluid under pressure to the tubular member 16 is maintained, the inner and outer members 19, 19a, guides 11, 11a, and elevating member 13 will be raised to higher levels and/or to the position shown in Fig. 4. No claim is made herein to the specific form of hydraulically operated elevating means herein shown, as I believe such means to be the sole invention of the said Max Lehmann, of East Cleveland, Ohio.

To raise the elevating member, the lever 18a is operated from neutral to one position to supply fluid pressure to the tubular member 16, whereas operation of the lever 18a to its other position relative to neutral, the elevating member gravitates and the fluid flows in the opposite direction to and through the valve mechanism to a reservoir. Upon operation of the elevating member 13 to any selected level, it may be maintained at that level, by movement of the lever 18a to neutral position, which prevents fluid flow to or from the member 16.

In Figs. 1 to 6, inclusive, the trunnion bearings 14a are disposed in a vertical plane disposed midway the rollers 15 and at right angles to axes thereof, whereas Fig. 7a shows a modified form of carrier wherein the wall 13c is provided with a base 21 having upwardly extending bosses 21a arranged to support the trunnion bearings at an angle inclined to a plane disposed at right angles to the axes of the rollers 15. The mechanism 14 in each form of mounting is similar in construction and operation and includes a main driven shaft 22 mounted in a pair of main anti-friction bearings 22' the axis of which is disposed at and intersects the axis of the trunnions on the housing 14x, a driven shaft 23 the axis of which is disposed in angular relation to and intersects the axis a common to the axes of the trunnions and main shaft and a shaft 24 for driving the shafts 22 and 23 preferably having an axis disposed radially of and intersecting the common axis a. By preference the shaft 23 is disposed at right angles to the shaft 22, so that in one operating position the mechanism 14 is disposed in a horizontal position and in its other operating position it is disposed vertically, as shown in dotted lines in Figs. 1 and 4.

The mechanisms 14, in co-operation with the raising and lowering means for the elevating member is adapted for carrying out two separate operations, namely (a) to drill a hole x in the ceiling of an excavated area for a device, which, or an element on its outer end, must be turned to effect a clamping relation between a ceiling engaging member A and the ceiling A' and (b) to rotate the device or element thereon into final clamped position.

Figure 3:
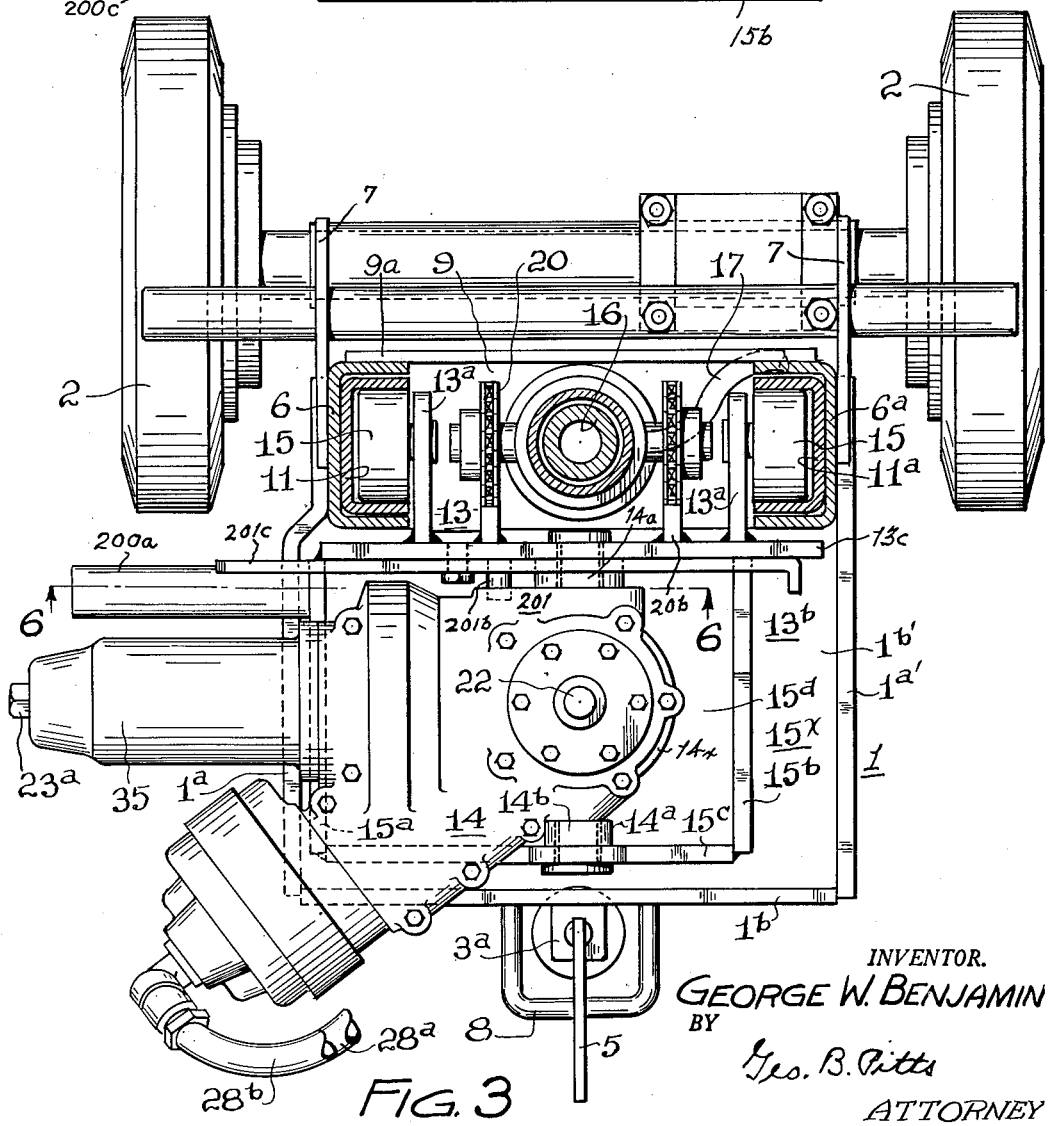
Fig. 3 is a plan view, partly in section on the line 3—3 of Fig. 1.

As shown in Figs. 7a and 8, the housing 14x encloses separate driven mechanisms for the shafts 22, 23, respectively, drivingly connected to shaft 24, the outer end of the latter shaft being provided with a coupling 24a removably connected to the shaft 27 of a motor 28—preferably a hydraulic motor having fluid supply and discharge connections 28a, 28b, respectively. The supply of fluid under pressure to the connection 28a and discharge from the connection 28b is controlled by a valve in the valve housing 18 having an operating lever 18b. When the shaft 22 is in its operative position, it is disposed vertically, as shown in Figs. 1, 2 and 3. The anti-friction bearings for the shaft 22 are preferably of the tapered roller bearing type, the outer races of the bearings being seated in the annular walls of alined openings 22a, 22a', formed in the sections of the casing or housing 14x and held in position by removable caps 22b, 22b', respectively. The hub of a bevel gear 29, which is keyed to the shaft 22, engages the inner race of the upper bearing, whereas the inner race of the other bearing is engaged by a spacing sleeve 29a between it and the gear 29. The gear 29 meshes with a pinion 30 on the inner end of the shaft 24. The shaft 22 extends through the cap 22b' and terminates in a screw threaded end portion 22x on which a fitting 31 is removably mounted, as shown in Figs. 2 and 8. The fitting 31 consists of an elongated member, formed with a through opening, one end portion of which is provided with screw threads adapted to be threaded on the shaft end 22x, whereas its opposite end portion is of non-circular shape in cross section as shown at 31a and arranged to removably receive the correspondingly shaped butt-end b of the shank for a drill B. The opposite or active end of the drill B may be of any preferred form of construction. The length of the drill B may vary according to the depth of the hole to be drilled and the depth thereof will be dependent on the kind of earth, rock and mineral formation that forms the roof; as shown, the drill B is relatively long so as to drill a hole which extends into the roof wall to a point where the material thereof is in a substantially solid state. As later set forth (see Fig. 7), after the hole is drilled, a device c is inserted and anchored therein, so that by rotating the device or a nut on its outer end a plate or bar A may be clamped in engagement with the roof A'.

The shaft 24 is mounted in suitable anti-friction bearings (preferably of the tapered roller bearing type), one bearing 32 being disposed adjacent the gear 30 and the other bearing 32a being disposed between the coupling 24a and wall of the housing 14x. Between the bearings 32, 32a, the main shaft 24 is provided with a bevel gear 33 suitably keyed thereto and meshing with a gear 33a fixed to a shaft 34 to drive the latter. The shaft 34 is mounted in inner and outer thrust bearings 34a, 34b, each preferably of the tapered roller bearing type, disposed on the opposite sides of the gear 33a. The outer races of the bearings 34a, 34b, are mounted in seats formed in the opposed meeting walls of the sections forming the housing 14x. The shaft 34 extends into and has driving connection with a mechanism, indicated as an entirety at 36, which is mounted in a casing 35, for driving the shaft 23, as later set forth. The shaft 23 extends through and beyond the outer end of the casing 35, the extended end 23a thereof being of non-circular shape in cross section and providing a connection for a removable fitting 37. The fitting 37 is formed with a through opening 37a the inner portion of which is complementary to the shaft end 23a and is adapted to telescope thereon, as shown in Fig. 7. The wall at the outer end of the fitting 37 is enlarged and forms a seat 37b for the head of a bolt or screw c which is to be anchored in the ceiling A'.

The mechanism 36 is preferably of the type which rotates the shaft 23 and simultaneously imparts thereto intermittent impacts; that is, the shaft 23 is continuously rotated through co-acting cam elements to initially rotate the anchoring device, but when resistance to rotation thereof takes place, as the device is forced into the adjacent earth formation, the co-acting cam elements serve to put a spring under tension whereupon one cam element rides the adjacent cam element and through its engagement with a succeeding cam element effects a rotative acceleration on the shaft 23 and thus transmits therethrough successive impacts on the head of the device c, which operation insures movement of the latter into final position, whereby the roof engaging plate A is secured in rigid relation by the anchored device against the ceiling A'.

As shown in Fig. 7a, the shaft 34 extends through an opening into a cup member 38, the bottom wall of which engages a thrust bearing 38a, mounted on the bottom wall of the casing 35. The wall of the opening is of non-circular shape and the adjacent portion of the shaft 34 is of complementary shape, whereby the cup member 38 is driven. The cup member 38 telescopes into the lower portion of a hollow member 39 the outer end of which is provided with a cap 39a. The hollow member 39 slidably and rotatably fits the side wall of the casing 35. The side wall of the hollow member 39 is formed with diametrically related openings 39b and the adjacent inner walls of the member are relieved to form elongated recesses 39c, the inner end walls of which form seats 40. Each of the seats 40 is related to a seat formed in the outer side wall of the cup member 38, the related seats accommodating balls 40a to provide a driving connection from the member 38 to the hollow member 39. 41 indicates an intermediate shaft between and axially related to the driving shaft 34 and driven shaft 23. The inner end portion of the shaft 41 extends into the member 38 and is enlarged and formed with an axially disposed chamber the walls of which form a bearing for the outer end portion of the shaft 34. The shaft 41 extends loosely through an axial opening formed in the cap 39a and into an inwardly extending opening 41a formed in the head 42 on the inner end of the shaft 23. The outer end portion of the casing 35 is reduced to form a shoulder 35a. A bushing 43 having a flange 43a at its inner end engages the shaft 23 and head 42 and rotates in a shell 44, which is formed with an annular recess for maintaining an oil containing fibrous ring or gland. The inner end of the shaft 41 engages the bottom wall of the cup member 38, whereas its outer end engages the end wall of the opening 41a. In this arrangement, the shaft 23 is rotatably supported in the reduced end portion of the casing 35 and on the shaft 41 and the latter maintains the head 42 and bushing in rotative engagement with the shell 44. 45 indicates a coiled expansion spring surrounding the shaft 41 and engaging at its opposite ends the bottom of the cup member 38 and cap 39a. The spring 45 tends to bias the hollow member 39 outwardly to maintain the balls 40 in driving relation with the walls of their seats, outward movement of the hollow member being limited by the outer walls of the seats formed in the cup member 38. The inner face of the head 42, adjacent its periphery, is provided with diametrically related cam elements 46, 46a, extending toward the cap 39a, whereas the outer face of the cap 39a, adjacent its periphery is provided with a cam element 47 extending toward the head 42 to provide an overlapping relation with each of the cam elements 46, 46a, when in engagement therewith. From the foregoing description it will be observed that the shaft 34 operating through the cup member 38 and hollow member 39, revolves the cam element 47, which being in engagement with one of the cam elements 46, 46a, drives the shaft 23; accordingly, the fitting 37 may be rotated to turn the anchoring device, but when this rotation is resisted by a force sufficient to overcome the tension of the spring 45, the cam element 47 will force the hollow member 39 inwardly against the tension of the spring 45 and ride the adjacent cam element and then engage the other cam element with a quick blow, effecting an impact thereon, which impact operation will be repeated by alternate engagement of the cam element 47 with and riding on the cam elements 46, 46a, until the roof engaging member is secured in fixed position against the roof A' in co-operation with an expandible element c' on the inner end of the bolt c.

From the foregoing description it will be noted that two mechanisms are provided, one mechanism for driving the shaft 22, which through a tool having a suitable active outer end drills a hole in the roof A' and one for driving the shaft 23, which through a device, preferably a bolt carrying at its inner end an expandible element, clamps a roof engaging member against the roof A', the latter mechanism being capable of imparting a rapid initial rotation to the bolt and a rotational tightening movement thereto by means of successive intermittent impacts. It will also be noted that the motor driven shaft 24 is drivingly connected to the shaft 22 and indirectly connected to the shaft 23 and both of the latter shafts are driven when the motor 28 is operated, but since one shaft only can be employed when either operation is being carried out, the other shaft idles in its bearings; this arrangement simplifies the construction since mechanisms to alternately connect in and disconnect each shaft 22, 23, are eliminated.

100 indicates as an entirety a mechanism for engaging and guiding the upper end portion of the drill B in co-operation with the fitting 31 (see Figs. 1, 2, 9, 10, 14 and 15), whereby during raising of the mechanism 14 (a) danger of the active end of the drill chipping the surface of the roof as the drill engages therewith is avoided and (b) the rectilinear movement of the drill is maintained parallel to the direction of movement of the mechanism 14, so that danger of the drill being veered laterally, as the drill moves upwardly into the roof, is eliminated. This enables the anchoring device c to be readily inserted and positioned in the hole x and insures the opposed forces incident to clamping a roof engaging member in final position to be endwise of the device and at substantially right angles to the roof engaging members. The mechanism 100 consists of the following: 101 indicates an inwardly extending bracket fixed to the adjacent wall 14 and provided with a pair of stud shafts 101a which extend through the bracket 101 and pivotally support on their lower ends a pair of arms 102. The upper ends of the shafts 101a are provided with gearing elements 103 (such as spur teeth) in mesh, whereby swinging movement imparted to one arm in one direction will impart a corresponding movement to the other arm in the opposite direction. The outer ends of the arms 102 are provided with elongated guide elements 102a each of substantially semi-circular shape in cross section arranged to co-act with the other element 102a to engage the drill shank and guide it during endwise movement thereof by operation of the elevating member 13 upwardly. 104 indicates pins preferably depending from the arms 102 and connected together by a spring 105. The pins 104 are so disposed with respect to a plane cutting the axes of the shafts 101a that in the movement of the arms to their closed or operative position the spring 105 is positioned on the inner side of the above referred to plane and accordingly the arms are held in their operated position as shown in Fig. 14, whereas when the arms 102 are swung to their inoperative position, as shown in dotted lines in Fig. 14 and full lines in Fig. 15, the spring tends to maintain them in the latter position against the inner sides of the guides. An outwardly projecting handle 106, preferably fixed to one of the elements 102a, may be manually grasped to swing the arms 102a from either position to their other position.

200 indicates as an entirety a counterbalancing means for facilitating the swinging of the housing 14 from its horizontal position, as shown in Fig. 1, to its vertical position, as shown in dotted lines in Figs. 1 and 4, and 201 indicates as an entirety a latch for locking the housing 14 in either position. The counter-balancing means consists of a hollow guide member 200a extending laterally outwardly from the side wall 15a of the carrier, namely, that side wall on which the housing 14 is seated when in horizontal position. The inner end of the hollow member 200a is welded on the adjacent side wall, so that the latter provides an abutment for one end of a coiled expansion spring 200b. The opposite end of the spring 200b engages a follower 200c. The follower 200c is mounted on a rod 200d in engagement with a head on the outer end thereof. The rod 200d extends through the spring and a through opening formed in the adjacent side wall 15a of the carrier. The follower is guided by the inner wall of the member 200a. The inner end of the rod 200d is connected to a resilient metallic band 200e, the outer end of which is suitably connected to the side wall of the housing 14x. The length of the rod 200d and band 200e and the connection of the latter to the housing 14x is such that when the latter is swung to its horizontal position, the outer end portion of the band 200e wraps around the wall of the housing (see Fig. 6) and pulls the rod 200d inwardly the effect of which compresses the spring 200b under tension, as shown, and cushions the movement of the housing 14x to the horizontal position. When the housing is to be moved to its vertical position, the energy stored in the spring 200b counter-balances the housing and thus facilitates such swinging movement. As the housing 14x is manually swung from either position to its other position, it will be readily appreciated that counter-balancing means is advantageously employed. In swinging the housing to its vertical position the rod 200d is moved outwardly by the spring. The latch 201 consists of two pins 201a, 201b, each mounted on the housing in relation to one position of the latter and a lever 201c fulcrumed intermediate its ends on the wall 13c. The outer end portion of the lever 201c forms a handle for operating it. The inner end portion of the lever 201c is formed with a notch 201d arranged to removably engage either pin 201a, 201b, depending on the position to which the housing 14x is moved, and thus lock the latter against movement to its other position. The inner end of the lever 201c is weighted as compared to its outer end, so that the lever normally lies in pin engaging position. As shown, the lever 201c at either side of the notch 201d is provided with inclined walls 201e leading to the outer ends of the opposite side walls of notch 201d, so that when the housing 14x is swung from either position to its other position the lever is manually operated to disengage it from the adjacent pin and may then be released and allowed to swing to its pin engaging position; in this event the other pin will, by engagement with the adjacent inclined wall 201e, rock the lever in one direction and after the pin rides the wall 201e, the lever will rock in the opposite direction and effect engagement of the notch walls with the adjacent pin.

Figs. 9 to 13, inclusive, show a modified form of apparatus wherein the elevating mechanism for the operating mechanism is mounted on a self-propelled steerable vehicle. In these views, 48 indicates as an entirety a frame mounted on wheels, which preferably consist of a pair of traction wheels 49 driven in the manner later set forth and a front steerable wheel 49a mounted in a yoke 49b. The yoke 49b is provided with an upwardly extending shank 49c rotatably mounted in and extending through suitable bearings 50 which are seated in a base 50a. The base 50a is disposed within and is secured to converging walls 50b, connected together at their outer ends by a cross plate 50c, which forms the front end wall of the frame 48, and a rear transverse wall 50d forming part of the frame 48. The shank 49c above the base 50a is provided with a sprocket 51 engaged by an endless chain 51a which is driven by a sprocket 51b. The sprocket 51b is fixed to a shaft 52 suitably mounted in the frame 48 and provided at its upper end with a steering wheel 52a.

The frame 48, rearward of the transverse wall 50d is provided with a platform 48a which supports a housing 53 for a purpose later apparent. At one side of the housing 53 and rearward of the steering wheel 52a is a seat 54 adjacent a flooring 54a and provided with a back 54b.

The housing 53 encloses a power plant indicated diagrammatically at 55, for driving a shaft 55a. The power plant may consist of an internal combustion engine or an electric motor supplied with current from suitable batteries or by means of a cable connected with a source of electric current supply. Where an electric motor supplied with current from batteries is employed, the latter may be mounted in a suitable compartment indicated at 55b. The wheels 49 are driven through a suitable transmission in a housing 56 by a shaft 56a. The shaft 56a is connected by a coupling 56b to the shaft of a motor 57. The casing for the motor 57 is suitably bolted to the rear end wall of the housing 53. The motor 57 is preferably driven hydraulically, having liquid supply under pressure and discharge connections 57a, 57b, but it will be obvious that an electric motor may be employed to drive the wheels 49. The hydraulically operated motor 57 and its valve controlled connections with a pump and reservoir are of a well known form of construction for which reason these parts are not illustrated.

The shaft 55a is connected through a coupling 58 to a shaft 58a which is suitably connected to the alined rotors of pumps 59, 60. The pumps 59, 60, are provided with fluid inlets 59a, 60a, respectively, having supply connections 59x, 60x, respectively, leading from a suitable sump. The pumps 59, 60, are provided with fluid outlets 59a', 60a', the outlet 59a' being connected by a conduit to a casing 61 enclosing a valve mechanism which is operated by a lever 61a.

The lever 61a controls the flow of the fluid under pressure through a pipe 62 to and from the lower end of an element forming part of an elevating mechanism 63, which may be similar to and operate in the same manner as that shown in Figs. 1, 2, 3 and 4. The outlet 60a' is connected by a pipe 64 with one side of a hydraulically operated motor 64x which drives the mechanism 65, the outlet from the motor 64x being connected to the sump. The supply of fluid pressure through the connection 64 is controlled by a valve (not shown). The motor 64x and mechanism 65 are similar in construction and operation to the motor 28 and mechanism 14, respectively, already described, the mechanism 65 being trunnioned as shown in Fig. 7a.

The elevating mechanism 63 and carrier thereon are mounted to swing about a horizontally disposed axis from a normal position substantially perpendicularly to the floor or travel surface laterally in either direction to selected positions, one inclined position of the elevating mechanism being shown in dotted lines in Fig. 12. In this form of construction it will be observed that the guides 66, 66a, for the elevating member 67 can be disposed perpendicularly to the surface of the ceiling A dependent on whether such surface is horizontal or inclined outwardly and downwardly. When each of the driving shafts for the drill and anchoring device is in operative position, the axis thereof is parallel to the direction of movement of the elevating member 67, so that when the hole is being drilled the latter will extend perpendicularly to the ceiling surface adjacent the hole and when the anchoring device is positioned it may be moved axially of the hole and thus avoid any distortion of the celing structure. The mounting for the elevating mechanism consists of the following: 68 indicates a transverse wall fixed to and depending from the cross plate 50c. 69 indicates a wall suitably fixed along its lateral side portions to the inner side walls of the guides 66. The lower portions of the walls 68, 69, midway the guides are formed with openings 68a, 69a, respectively, in registry and support a pivot 70 (such as a bolt), whereby the wall 69 is pivotally connected to the wall 68 and swingably supports the guides 66, 66a, on the latter wall for movement laterally in either direction. The pivot 70 is preferably predeterminately positioned above the lower end of the wall 69 so that when the guides 66, 66a, are swung in either direction about pivot 70, such movement will be limited by the engagement of the adjacent end of the base 71 (which is fixed to the lower ends of the guides 66) with the floor or ground as shown in dotted lines in Fig. 12. As shown in Figs. 9 and 13, the walls 68, 69, are in face-to-face engagement, the latter wall having slidable engagement with and guided by the wall 68. The wall 69 may be secured to the wall 68 in the normal position of the guides 66, 66a, or in any selected operated position by suitable means preferably consisting of the following: 72 indicates a series of openings formed in one of the walls 68, 69, and disposed in an arcuate row concentric to the axis of the pivot 70 and an opening 73 in the other wall spaced from the pivot 70 a distance equal to the radius of arcuate row of openings 72, so that the opening 73 may be positioned selectively in registry with each of the openings 72 and the wall 69 secured to the wall 68 by the insertion of a removable pin 74 into the registered openings, as shown in Fig. 13. As shown in Fig. 13, the openings 72 are formed in the wall 68 and the opening 73 is formed in the wall 69. The connection for securing the wall 69 in normal or a selected adjusted position preferably consists of a nut 75 welded on the exposed face of the wall 68 with the threaded opening therethrough in registry with the opening 72 and a screw threaded pin 74 extending through the openings 72 and 73 and the nut and having threaded engagement with the nut 75, whereby the pin is held against accidental removal, due to vibrations incident to the operations of the mechanism 65 or driving of the vehicle. The securing pin 74 co-operates with the pivot 70 to support the wall 69 on the wall 68.

Each form of construction herein disclosed is operable in the following manner; the elevating member is positioned at its lowest position and the housing for the driven mechanisms is positioned on the carrier to aline the shaft 22 with the area to be drilled, a drill B is mounted in the coupling member on the upper end of the shaft 22 and the guides 66, 66a, are positioned in perpendicular relation to the area of the roof that is to be drilled and reinforced, such as shown in full lines or dotted lines in Fig. 12. The motor 28 is started to drive the shafts 22, 23. The elevating member is then operated to raise the carrier, which movement projects the rotating drill into the roof. In practice the drill may be of various lengths, in some instances seven feet. At the end of the drilling operation, the motor 28 is stopped and the elevating member is lowered to its first position and the drill removed. The housing 14x is then swung to the position shown in dotted lines in Fig. 1 to aline the shaft 23 with the drilled hole x. The device 37 is mounted on the shaft end 23a and the head of a bolt having an expansible element and roof engaging member assembled thereon, is seated in the device 37. The elevating member is operated to raise the carrier and project the bolt into the drilled hole until the roof engaging member engages the roof, as shown in Fig. 7, at which position upward movement of the elevating member is stopped. The motor 28 is then operated to rotate the shaft 23 the effect of which is to turn the bolt. In turning the bolt the expansible element grips the wall of the hole and as the shaft 23 continues to turn the bolt becomes anchored in the hole x and finally by the impacts transmitted to the bolt the head thereof is tightened against the roof engaging member to secure it in position.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In apparatus for securing supporting members in substantially face-to-face relation with roofs in excavated areas, the combination with a portable frame, of vertically disposed guides on said frame, a support mounted on and movable endwise of said guides and provided with horizontally disposed alined bearings, means for raising said support, and a power driven mechanism consisting of a housing trunnioned on said bearings, said housing being provided with angularly related pairs of bearings, the axes of said pairs of bearings intersecting each other on the axis of said trunnions, a shaft mounted in each pair of bearings and adapted to support and rotate a device, a separate shaft drivingly connected to said first mentioned shafts and means for driving said separate shaft, said housing being swingable on said trunnions to position either of said shafts parallel to said guides.

2. In a mechanism for positioning supporting members in substantially face-to-face relation with roofs in excavated areas, the combination with a portable frame, of vertically disposed guides on said frame, a power operated support on and movable endwise of said guides and provided with horizontally disposed trunnions, and a power driven mechanism consisting of a housing mounted on said trunnions for movement to and from a predetermined position, said housing being provided with pairs of bearings, the axes of said pairs of bearings being in angular relation and intersecting each other on the axis of said trunnions, a shaft mounted in each said pair of bearings, a motor drivingly connected to one of said shafts, driving connections between said driven shaft and said other shaft and a third shaft drivingly connected to said driven shaft and disposed at right angles to the axes of said pairs of bearings and axially of the point of intersection of said axes on the axis of said trunnions, said housing being swingable on said trunnions to position either said other shaft or said third shaft in a vertically disposed operating position, one of said shafts being adapted to support and rotate a device during vertical movement of said support toward the roof of the excavated area.

References Cited in the file of this patent

UNITED STATES PATENTS

| | | |
|---|---|---|
| 2,293,396 | Mathews | Aug. 18, 1942 |
| 2,303,565 | Luna | Dec. 1, 1942 |
| 2,318,595 | Curtis | May 11, 1943 |
| 2,357,001 | Hope | Aug. 29, 1944 |
| 2,365,681 | Gartin | Dec. 26, 1944 |
| 2,459,970 | Smith | Jan. 25, 1949 |
| 2,480,537 | Arps et al. | Aug. 30, 1949 |
| 2,520,390 | Feucht | Aug. 29, 1950 |
| 2,540,574 | Feucht | Feb. 6, 1951 |
| 2,547,329 | Lapham | Apr. 3, 1951 |
| 2,553,531 | Graves | May 15, 1951 |
| 2,580,110 | Mabry | Dec. 25, 1951 |

OTHER REFERENCES

"Coal Age" magazine, April 1950, "How You Can Get More from Roof-Bolting," pages 71–75.